US008503395B2

(12) United States Patent
Choi et al.

(10) Patent No.: US 8,503,395 B2
(45) Date of Patent: Aug. 6, 2013

(54) APPARATUS AND METHOD FOR TRANSMITTING LOAD INDICATOR IN A BROADBAND WIRELESS COMMUNICATION SYSTEM

(75) Inventors: Sung-Hyun Choi, Seoul (KR); Young-Kyu Choi, Incheon (KR); Byoung-Gi Jang, Suwon-si (KR); Ki-Young Han, Yongin-si (KR); Byoung-Ha Yi, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 362 days.

(21) Appl. No.: 12/753,483

(22) Filed: Apr. 2, 2010

(65) Prior Publication Data

US 2010/0254279 A1  Oct. 7, 2010

(30) Foreign Application Priority Data

Apr. 2, 2009 (KR) .................. 10-2009-0028646

(51) Int. Cl.
*H04W 4/00* (2009.01)

(52) U.S. Cl.
USPC .................................... 370/331; 455/436

(58) Field of Classification Search
USPC ............................. 370/331; 455/436
See application file for complete search history.

(56) References Cited

U.S. PATENT DOCUMENTS

| 8,068,838 | B1 * | 11/2011 | Dinan et al. | 455/436 |
| 2001/0014121 | A1 * | 8/2001 | Kaye et al. | 375/240.03 |
| 2004/0266474 | A1 * | 12/2004 | Petrus | 455/525 |
| 2005/0176440 | A1 * | 8/2005 | Sang et al. | 455/453 |
| 2006/0003767 | A1 * | 1/2006 | Kim et al. | 455/436 |
| 2009/0154425 | A1 * | 6/2009 | Patil et al. | 370/332 |
| 2010/0173631 | A1 * | 7/2010 | Kim et al. | 455/436 |

* cited by examiner

*Primary Examiner* — Luat Phung
(74) *Attorney, Agent, or Firm* — Jefferson IP Law, LLP

(57) ABSTRACT

A method and apparatus for providing load state information of a Base Station (BS) in a broadband wireless communication system are provided. The method includes determining a ratio of a whole allocated resource compared to a whole resource of the BS and a ratio of a resource allocated for a rate requiring security compared to the whole resource, generating at least one load indicator for indicating a first value expressing the ratio of the whole allocated resource and a second value expressing the ratio of the resource allocated for the rate requiring security, and transmitting the at least one load indicator.

22 Claims, 9 Drawing Sheets

APPARATUS AND METHOD FOR TRANSMITTING LOAD INDICATOR IN A BROADBAND WIRELESS COMMUNICATION SYSTEM

PRIORITY

This application claims the benefit under 35 U.S.C. §119 (a) of a Korean patent application filed in the Korean Intellectual Property Office on Apr. 2, 2009 and assigned Serial No. 10-2009-0028646, the entire disclosure of which is hereby incorporated by reference.

BACKGROUND OF THE INVENTION

1. Field of the Invention

The present invention relates to a broadband wireless communication system. More particularly, the present invention relates to an apparatus and method for transmitting a load indicator in a broadband wireless communication system.

2. Description of the Related Art

Load-aware Base Station (BS) selection is a scheme in which a Mobile Station (MS) determines a load state of BSs and selects a serving BS based on the load state. The load-aware BS selection can provide efficient system resource utilization and allow improved quality of communication for users. To support this scheme, each BS broadcasts a load indicator to inform of its own load state. Commonly, a resource utilization ratio is used as the load indicator.

In the case of traffic with a fixed rate such as voice communication, it is reasonable to use the resource utilization ratio as the load indicator. However, in the case of traffic such as Transmission Control Protocol (TCP) for adaptively increasing a data rate according to bandwidth margin through an end-to-end flow control, it is unsuitable to use the resource utilization ratio the load indicator. For example, if there is single traffic with a dynamic rate, such as TCP, in a cell, a radio resource utilization ratio can be equal to 100%. However, based on the rate constraint, the cell can be serviced by new traffic and additionally provided with traffic with another dynamic rate. That is, in a case where it is intended to add traffic with a rate constraint such as real-time traffic, the traffic with the rate constraint can be added by preempting a resource of the traffic with the dynamic rate through prioritized bandwidth assignment.

As described above, when a resource utilization ratio is equal to 100%, new traffic can be added due to traffic with a dynamic rate. However, despite that the addition of the new traffic is possible, a load indicator based on a resource utilization ratio fails to indicate a concrete characteristic on a load state. Therefore, the addition of new traffic is interrupted.

Therefore, a need exists for an apparatus and method for transmitting a load indicator of a serving BS in a broadband wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for preventing a phenomenon in which new traffic is not added because of a resource utilization ratio disregarding a characteristic of traffic in a broadband wireless communication system.

Another aspect of the present invention is to provide an apparatus and method for expressing a load state based on a characteristic of traffic in a broadband wireless communication system.

A further aspect of the present invention is to provide an apparatus and method for additionally providing an inflexible resource utilization ratio in addition to a whole resource utilization ratio as a load indicator of a Base Station (BS) in a broadband wireless communication system.

The above aspects are achieved by providing an apparatus and method for transmitting a load indicator in a broadband wireless communication system.

In accordance with an aspect of the present invention, a method for providing load state information of a Base Station (BS) in a broadband wireless communication system is provided. The method includes determining a ratio of a whole allocated resource compared to a whole resource of the BS and a ratio of a resource allocated for a rate requiring security compared to the whole resource, generating at least one load indicator for indicating a first value expressing the ratio of the whole allocated resource and a second value expressing the ratio of the resource allocated for the rate requiring security, and transmitting the at least one load indicator.

In accordance with another aspect of the present invention, a method for handover of a Mobile Station (MS) in a broadband wireless communication system is provided. The method includes determining, through at least one load indicator included in a message received from a BS, first values expressing ratios of whole allocated resources compared to the whole resources for neighbor BSs and second values of expressing ratios of resources allocated for rates requiring security compared to the whole resources, selecting a target BS among the neighbor BSs based on the first values and the second values, and performing a handover to the target BS.

In accordance with still another aspect of the present invention, a method for a paging response of an MS in a broadband wireless communication system is provided. The method includes, if a paging request occurs, determining, through at least one load indicator included in at least one message received from a BS, a first value expressing a ratio of the whole allocated resource compared to the whole resource for at least one BS and a second value expressing a ratio of a resource allocated for a rate requiring security compared to the whole resource, selecting a BS to access among the at least one BS based on the first value and the second value, and performing an initial access procedure to the BS to access.

In accordance with a further aspect of the present invention, a BS apparatus in a broadband wireless communication system is provided. The apparatus includes a controller, a generator, and a transmitter. The controller determines a ratio of a whole allocated resource compared to a whole resource of a BS and a ratio of a resource allocated for a rate requiring security compared to the whole resource. The generator generates at least one load indicator for indicating a first value expressing the ratio of the whole allocated resource and a second value expressing the ratio of the resource allocated for the rate requiring security. The transmitter transmits the at least one load indicator.

In accordance with yet another aspect of the present invention, an MS apparatus in a broadband wireless communication system is provided. The apparatus includes an analyzer and a controller. The analyzer determines, through at least one load indicator included in a message received from a BS, first values expressing ratios of the whole allocated resources compared to whole resources for neighbor BSs and second values expressing ratios of resources allocated for rates requiring security compared to the whole resources. The controller selects a target BS among the neighbor BSs based on the first values and the second values, and performs a handover to the target BS.

In accordance with another aspect of the present invention, an MS apparatus in a broadband wireless communication system is provided. The apparatus includes an analyzer and a controller. If a paging request occurs, the analyzer determines, through at least one load indicator included in at least one message received from a BS, a first value expressing a ratio of the whole allocated resource compared to the whole resource for at least one BS and a second value expressing a ratio of a resource allocated for a rate requiring security compared to the whole resource. The controller selects a BS to access among the at least one BS based on the first value and the second value, and performs an initial access procedure to the BS to be accessed.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 1A to 3 are diagrams illustrating examples of load states in a broadband wireless communication system according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figures 1A, 1B:
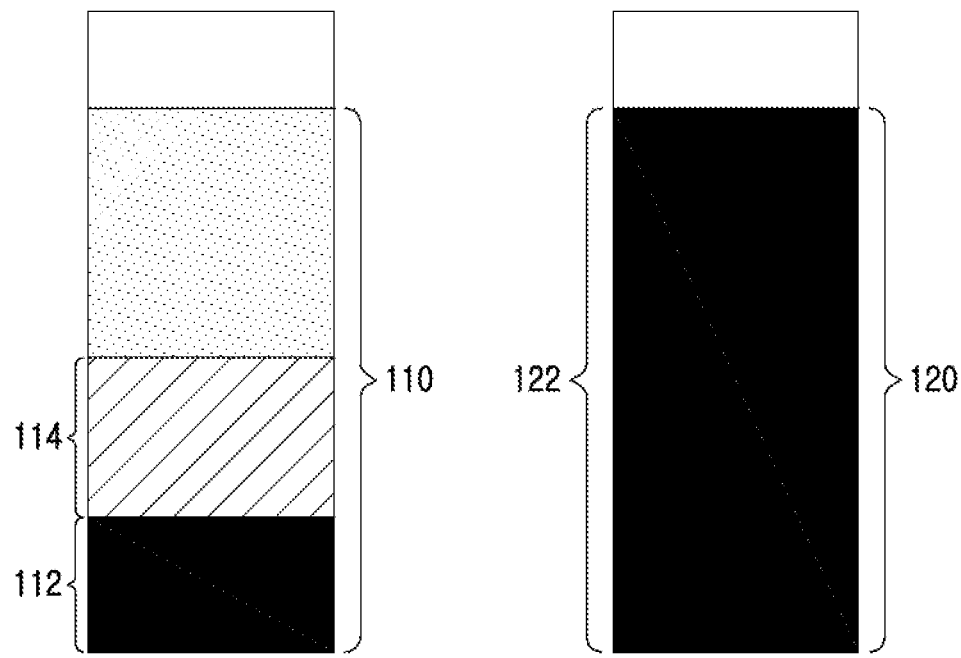

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a method and apparatus for expressing a load state of a Base Station (BS) based on a characteristic of traffic in a broadband wireless communication system. Exemplary embodiments of the present invention provide an Orthogonal Frequency Division Multiplexing/Orthogonal Frequency Division Multiple Access (OFDM/OFDMA) wireless communication system. However, other wireless communication systems may also be provided.

In an exemplary embodiment of the present invention, three types of traffic flow are considered as follows:

1) traffic flow with fixed rate;
2) traffic flow with constraint of minimum rate; and
3) traffic flow having no constraint of rate but having dynamic rate.

The third type of traffic flow with the dynamic rate is called a non-persistent traffic flow. In more detail, the first type of traffic flow is traffic having a guaranteed Quality of Service (QoS) through the fixed rate such as a Voice over Internet Protocol (VoIP) service. The second type of traffic flow is traffic such as Hyper Text Terminal Protocol (HTTP) and File Transfer Protocol (FTP) capable of adaptively varying a rate according to a bandwidth and also meeting a user QoS by securing a lower limit of the rate. Also, the non-persistent traffic flow, i.e., the third type, is traffic with no constraint of the minimum rate.

A Base Station (BS) allocates resources for the first type and the second type of traffic flows with priority over the non-persistent traffic flow in order to secure the fixed rate and the minimum rate of the first type and the second type traffic flows. In this application, the term "a rate requiring security" and similar will be used to indicate both the fixed rate of the first type and the minimum rate of the second type, which must be dedicated or secured to satisfy QoS requirements. Here, a throughput of the second type of traffic flow is a sum of the minimum rate secured through inflexible resource utilization and a rate determined through flexible resource utilization. Commonly, the first type and the second type of traffic flows are allocated resources with high priority over the non-persistent traffic flow for securing the fixed rate and the minimum rate. However, all resources may be necessary for securing the fixed rate and minimum rate. In this case, the non-persistent traffic flow can be discontinued. The non-persistent traffic flow does not require the securing of a fixed or minimum rate, but has to be prevented from a sudden discontinuation of communication at a service quality side. Accordingly, to secure a throughput of the non-persistent traffic flow to some degree, a higher limit of an utilizable resource for the fixed rate and minimum rate security is set. Thus, a BS sets a higher limit of an inflexible resource utilization ratio, and secures the fixed rate of the first type of traffic flow and the minimum rate of the second type of traffic flow within a range not exceeding the higher limit.

FIGS. 1A-3 are diagrams illustrating examples of load states in a broadband wireless communication system according to an exemplary embodiment of the present invention.

Referring to FIGS. 1A and 1B, load states with whole resource utilization ratios that are the same as each other are illustrated. However, in FIG. 1A, a resource for a rate requiring security, i.e., a sum of a resource 112 for securing a fixed rate of a first type traffic flow and a resource 114 for securing the minimum rate of a second type traffic flow, is less than the whole utilization resource 110. In FIG. 1B, a resource 122 for a rate requiring security is the same as the whole utilization resource 120. Thus, in FIG. 1A, a BS may service a new traffic flow by scheduling resources other than the resources 112 and 114 for securing the fixed rate and minimum rate of the first and second type traffic flows, and the remainder of the whole utilization resource 110 might be allocated, for example, to the second type of traffic flow. That is, the whole resource utilization ratios of FIGS. 1A and 1B might be the same as each other, but the load state of FIG. 1A is a state capable of servicing a new traffic flow. Thus, an inflexible resource utilization ratio corresponding to traffic flow requiring security, that is, a ratio of fixed and minimum traffic flow to a whole utilization resource, has a significant influence on understanding a load state. Thus, in an exemplary implementation, a BS broadcasts the whole resource utilization ratio and the inflexible resource utilization ratio together. Therefore, load state information based on a characteristic of traffic is provided.

Results from a case in which a BS broadcasts the whole resource utilization ratio and an inflexible resource utilization ratio, as described above, are described in more detail below.

Figure 2:
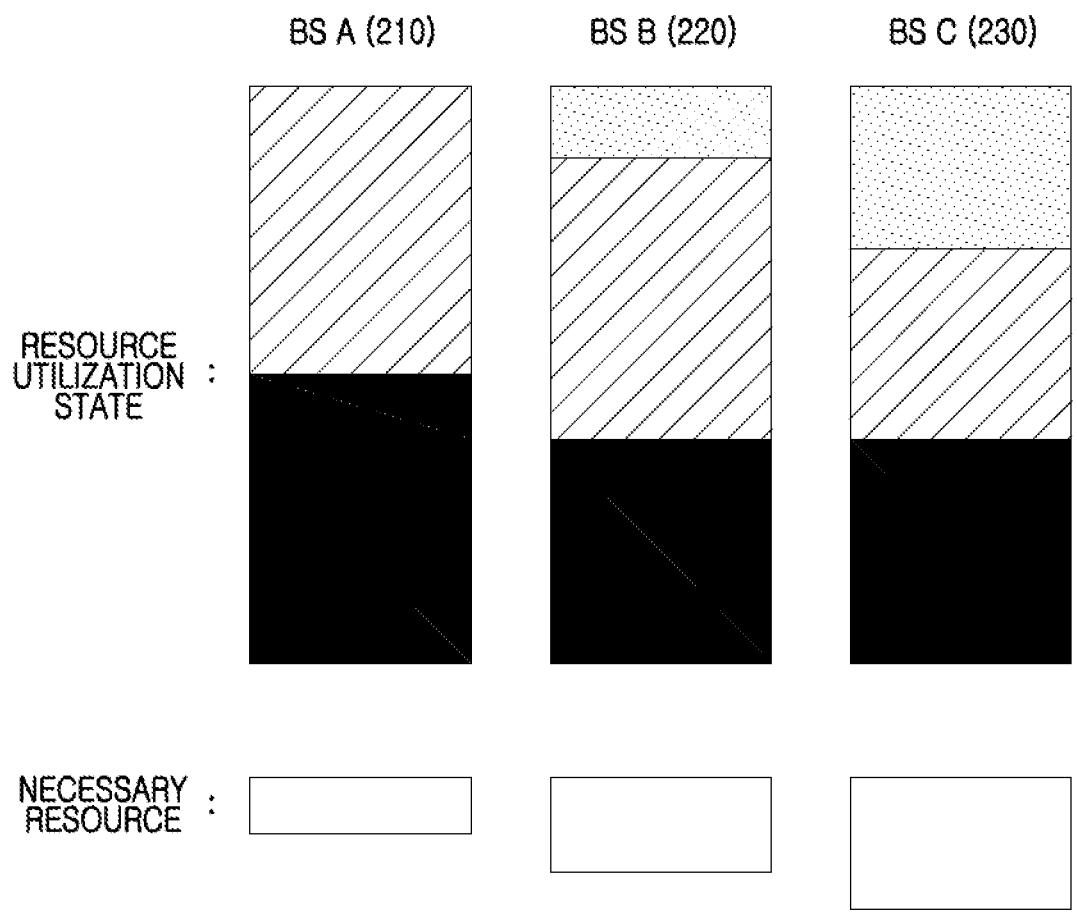

Referring to FIG. 2, load states of three BSs with the same whole resource utilization ratio are illustrated. In FIG. 2, a resource utilization ratio of each BS is equal to 100%, but an inflexible resource utilization amount decreases in order of a BS A 210, a BS B 220, and a BS C 230. A rate per resource decreases in order of the BS A 210, the BS B 220, and the BS C 230. Here, the decrease of the rate per resource denotes an increase of a resource amount necessary for transmitting data of the same capacity and denotes a relative deterioration of a channel quality.

It is assumed herein that an MS requesting a call is acceptable only to the BS C 230, except for the BS A 210 and BS B 220. In a case where the MS attempts to access a BS of a high rate per resource, the MS shall initially attempt to access the BS A 210. However, the call acceptance request of the MS is rejected and thus, the MS attempts to access the BS B 220 which is also rejected. By attempting to access the BS C 230, the MS succeeds in the access. However, when being informed of the inflexible resource utilization ratios, the MS recognizes that the BS C 230 has a majority of flexible utilizable resources. Accordingly, the MS initially attempts to access the BS C 230 and thus, may minimize an initial access delay.

Figure 3:
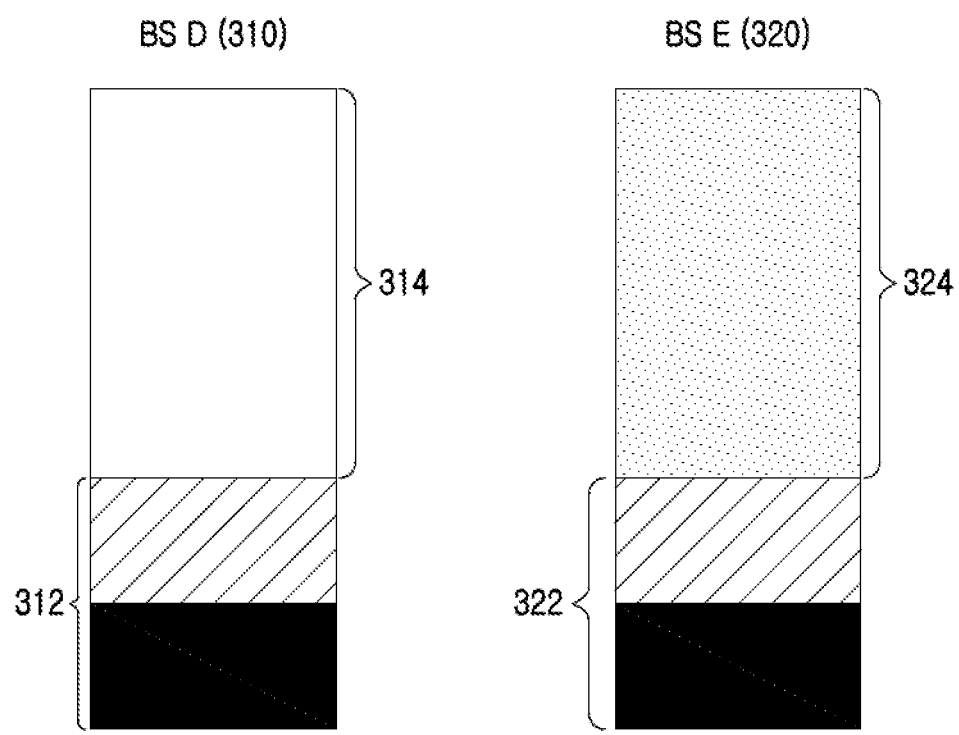

Referring to FIG. 3, load states of two BSs with the same inflexible resource utilization ratio are illustrated. In FIG. 3, a BS D 310 and a BS E 320 include the same inflexible resource utilization ratio. However, the BS E 320 has a greater whole resource utilization ratio than the BS D 310.

A throughput of a non-persistent traffic flow is proportional to a multiplication between an amount of allocated resources and a rate. However, providing only the whole resource utilization ratio, as described above, results in estimating an amount of available resources that is less than an actual amount of available resources. Therefore, an MS accesses a BS frequently, which is located far from the MS and has a relatively low rate and resource utilization ratio. Thus, an inflexible resource utilization ratio is provided and suppresses the frequent access to the BS. Additionally, the whole resource utilization ratio is provided together, which accomplishes a more efficient BS selection. That is, in a case where the inflexible resource utilization ratios are the same as each other and the whole resource utilization ratios are different from each other, as illustrated in FIG. 3, it can be determined as to whether a BS is suitable to access based on a difference between states of remaining resources, except for inflexible resources. In more detail, among the whole resource of the BS D 310, a remaining resource 314, except an inflexible resource 312, is in an unallocated state. Among the whole resource of the BS E 320, a remaining resource 324, except for an inflexible resource 322 is in a state of being allocated for a non-persistent traffic flow or a second type of traffic flow. If an MS accesses the BS D 310, the MS may occupy the remaining resource 314 without competing with other MSs. However, if the MS accesses the BS E 320, the MS is allocated the remaining resource 324 competitively with other MSs. Thus, there is a need to provide the whole resource utilization ratio such that the MS may recognize states of the remaining resources 314 and 324.

As described above, a BS according to an exemplary embodiment of the present invention broadcasts all of the whole resource utilization ratio and an inflexible resource utilization ratio. In a case of the Institute of Electrical and Electronics Engineers (IEEE) standard 802.16 system, a minimum reserved traffic rate for each service flow is defined. The minimum reserved traffic rate denotes a lower limit of a data rate, except for Media Access Control (MAC) overhead. Thus, the BS estimates an amount of radio resources for supporting the minimum reserved traffic rate based on a rate per resource of each MS, thereby being capable of determining the inflexible resource utilization ratio.

A serving BS selection of an MS using a load indicator as described above may be utilized for an initial driving process of the MS, a handover process, a paging response process, and the like. The handover process is described in more detail below.

By receiving a MOBile NeighBoR ADVertisement (MOB_NBR_ADV) message from a serving BS, an MS acquires information of neighbor BSs. The MS reads a list of the neighbor BSs included in the MOB_NBR_ADV message, performs scanning intended for the neighbor BSs, and selects a target BS among the neighbor BSs. At this time, if the load indicator is included in the MOB_NBR_ADV message, the MS may select a target BS through the above described procedure. The MOB_NBR_ADV message includes Downlink Channel Descriptors/Uplink Channel Descriptors (DCDs/UCDs) of neighbor BSs. For example, the DCD and the UCD include items shown in Tables 1 and 2 below.

TABLE 1

| Name | Description |
| --- | --- |
| Available DL Radio Resource | Indicating average ratio of non-allocated DL radio resource compared to the whole DL radio resource. The average ratio is determined during time duration defined by DL-radio_resource_window_size parameter. The average ratio is provided as relative load indicator.<br>0x00: 0%<br>0x01: 1%<br>. . .<br>0x64: 100%<br>0x65-0xFE: reserved<br>0xFF: indicating that information is invalid |
| Persistent DL Radio Resource | Indicating ratio of DL radio resource allocated as inflexible resource compared to the whole DL radio resource.<br>0x00: 0%<br>0x01: 1%<br>. . .<br>0x64: 100%<br>0x65-0xFE: reserved<br>0xFF: indicating that information is invalid |

TABLE 2

| name | description |
| --- | --- |
| Available UL Radio Resource | Indicating average ratio of non-allocated UL radio resource compared to the whole UL radio resource. The average ratio is determined during time duration defined by UL-radio_resource_window_size parameter. The average ratio is provided as relative load indicator.<br>0x00: 0%<br>0x01: 1%<br>. . .<br>0x64: 100%<br>0x65-0xFE: reserved<br>0xFF: indicating that information is invalid |
| Persistent UL Radio Resource | Indicating ratio of UL radio resource allocated as inflexible resource compared to the whole UL radio resource.<br>0x00: 0%<br>0x01: 1%<br>. . .<br>0x64: 100%<br>0x65-0xFE: reserved<br>0xFF: indicating that information is invalid |

Figure 4:
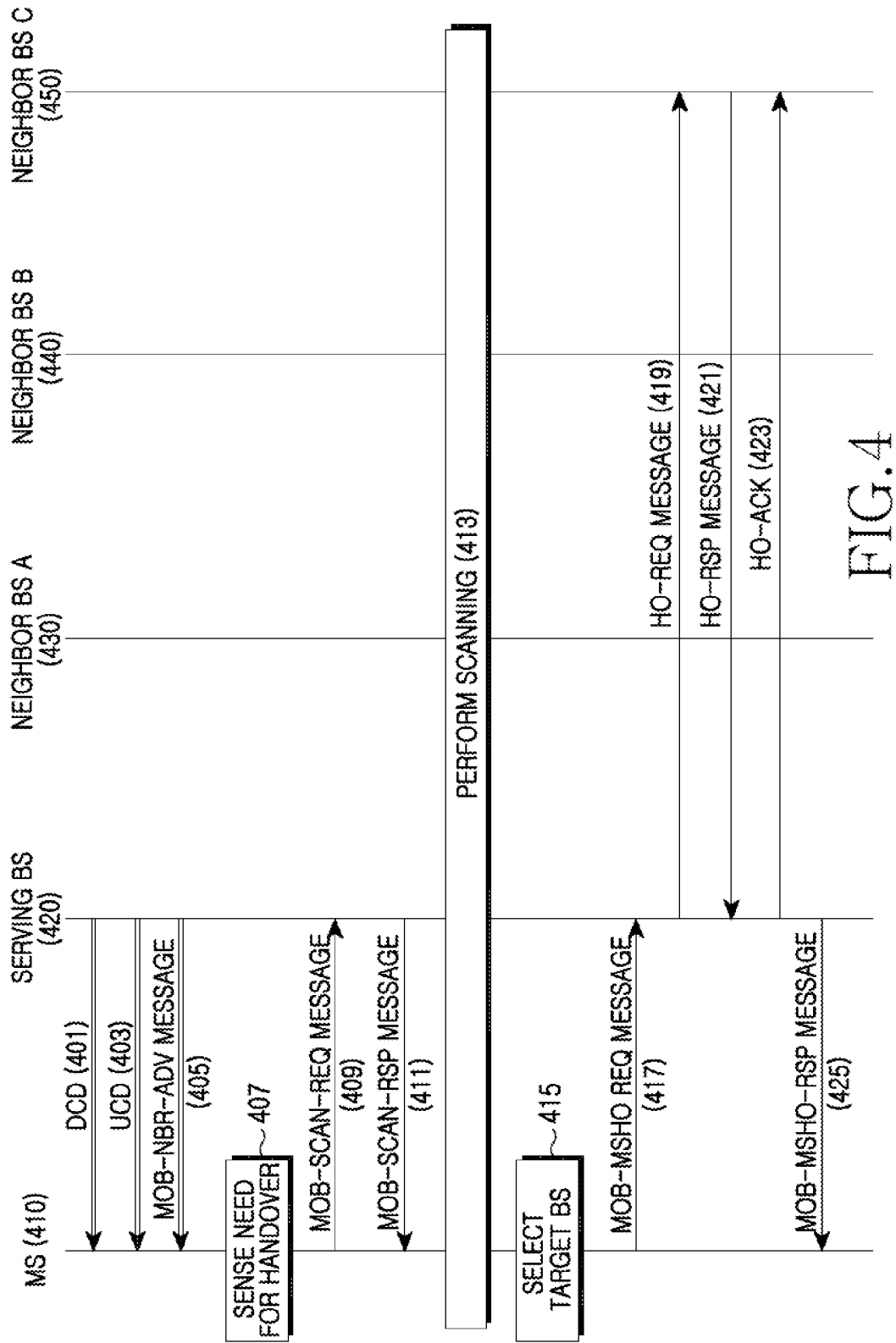
FIG. 4 is a ladder diagram illustrating signaling for handover in a broadband wireless communication system according to an exemplary embodiment of the present invention.

The MS selects the target BS using a scanning result and load state information identified through the DCDs/UCDs of the neighbor BSs. For example, assuming that there are three neighbor BSs and the three neighbor BSs have load states as illustrated in FIG. 2, the handover procedure is performed as illustrated in FIG. 4. In FIG. 4, an arrow drawn by a double solid line denotes information periodically transmitted.

FIG. 4 is a ladder diagram illustrating signaling for handover in a broadband wireless communication system according to an exemplary embodiment of the present invention.

Referring to FIG. 4, in step 401, an MS 410 receives a DCD from a serving BS 420. Also, in step 403, the MS 410 receives a UCD from the serving BS 420. In step 405, the MS 410 receives a MOB_NBR_ADV message. Here, the DCD and the UCD include a load indicator of the serving BS 420. The MOB_NBR_ADV message includes a list including a neighbor BS A 430, a neighbor BS B 440 and a neighbor BS C 450, and load indicators of the neighbor BS A 430, the neighbor BS B 440, and the neighbor BS C 450. In step 407, the MS 410 recognizes that the serving BS 420 channel quality becomes poor and determines a need for handover. In step 409, the MS 410 determining the need for handover transmits a MOBile SCAN REQuest (MOB-SCAN-REQ) message to the serving BS 420. In step 411, the serving BS 420 transmits a MOBile SCAN ReSPonse (MOB_SCAN_RSP) message to the MS 410. Accordingly, the MS 410 performs scanning intended for the neighbor BS A 430, the neighbor BS B 440, and the neighbor BS C 450, which are identified through the list included in the MOB_NBR_ADV message. That is, the MS 410 measures channel qualities with the neighbor BS A 430, the neighbor BS B 440, and the neighbor BS C 450. In step 413, the MS 410, which performs the scanning, selects a target BS based on the scanning result and the load indicator of each neighbor BS, which is acquired through the MOB_NBR_ADV message. Here, it is assumed that the load states of the neighbor BS A 430, the neighbor BS B 440, and the neighbor BS C 450 are the same as the load states as illustrated in FIG. 2. Accordingly, the neighbor BS C 450 is selected as the target BS. Thus, in step 417, the MS 410 transmits to the serving BS 420 a MOBile MS HandOver REQuest (MOB-MSHO-REQ) message that requests a handover to the neighbor BS C 450. In step 419, the serving BS 420 transmits to the neighbor BS C 450 a HandOver REQuest (HO-REQ) message that inquires about acceptance or rejection of the handover to the neighbor BS C 450. In step 421, the neighbor BS C 450 transmits to the serving BS 420 a HandOver ReSPonse (HO-RSP) message that informs of the handover acceptance. In step 423, the serving BS 420 transmits the neighbor BS C 450 a HandOver ACKnowledge (HO-ACK). In step 425, the serving BS 420 transmits to the MS 410 a MOBile MS HandOver ReSPonse (MOB-MSHO-RSP) message that informs that the handover is accepted. As a result, the MS 410 attempts to access the neighbor BS C 450 to perform the handover.

A paging response process is described in more detail below. An MS with no activated traffic flow may operate in an idle mode for power consumption of the MS. In a case of operating in the idle mode, the MS moves between cells without accessing a BS. Thus, when a call targeting the MS is generated, a paging request to the MS is accomplished in a paging area unit, which is a bundle of BSs within a preset range. The MS recognizing the paging request attempts to access a BS. At this time, the MS selects a suitable serving BS using a load indicator, which is acquired through a DCD/UCD of each BS.

Operations and constructions of a BS and an MS using a load indicator, as described above, are described in more detail below.

Figure 5:
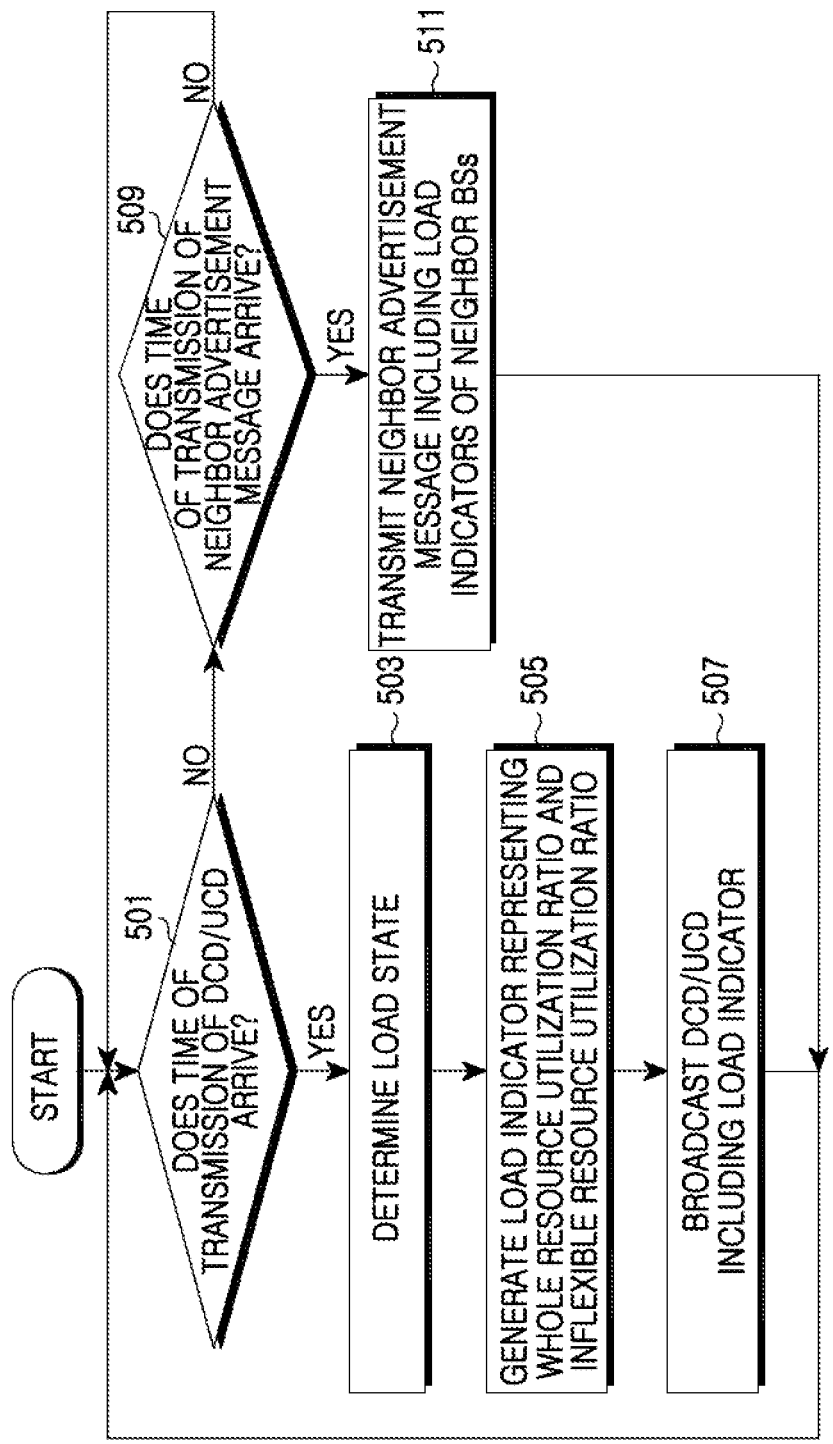
FIG. 5 is a flowchart illustrating an operation procedure of a Base Station (BS) in a broadband wireless communication system according to an exemplary embodiment of the present invention.

FIG. 5 is a flowchart illustrating an operation procedure of a BS in a broadband wireless communication system according to an exemplary embodiment of the present invention.

Referring to FIG. 5, in step 501, the BS determines if a time of transmission of a DCD/UCD arrives. The DCD/UCD is transmitted over a period of a few seconds to dozens of seconds, and includes physical channel information necessary for an MS to access the BS. More particularly, the DCD/UCD includes a load indicator representing the whole resource utilization ratio and an inflexible resource utilization ratio.

If the time of transmission of the DCD/UCD arrives, the BS may proceed to step 503. In step 503, the BS determines its own load state. Here, the load state denotes a ratio of the whole allocated resource compared to the whole resource and a ratio of a resource allocated for a rate requiring security. Accordingly, the BS determines the ratio of the whole allocated resource. The BS measures an amount of resources utilized for a fixed rate and the minimum rate of an activated first type and second type traffic flows. The BS then determines the ratio of the resource allocated for the rate requiring security.

After determining the load state, the BS proceeds to step 505. In step 505, the BS generates a load indicator representing the whole resource utilization ratio and an inflexible resource utilization ratio. Here, the whole resource utilization ratio denotes a ratio of the whole allocated resource identified in step 503, and the inflexible resource utilization ratio denotes the ratio of the resource allocated for the rate requiring security. However, the whole resource utilization ratio may be expressed as a ratio of a non-allocated resource and not a ratio of an allocated resource. In this case, the whole resource utilization ratio may be designated as an available resource ratio.

After generating the load indicator, the BS proceeds to step 507. In step 507, the BS generates a DCD/UCD including the load indicator and broadcasts the DCD/UCD through a broadcasting channel. For example, the DCD includes items shown in Table 1, and the UCD includes items shown in Table 2.

If a time of transmission of the DCD/UCD does not arrive in step 501, the BS may proceed to step 509. In step 509, the BS determines if the time of transmission of a neighbor advertisement message arrives. The neighbor advertisement message is transmitted over a preset period and is used to provide information of neighbor BSs to an MS intending to perform handover. More particularly, the neighbor advertisement message includes load indicators representing the whole resource utilization ratios and inflexible resource utilization ratios of the neighbor BSs.

If the time of transmission of the neighbor advertisement message arrives, the BS may proceed to step 511. In step 511, the BS transmits the neighbor advertisement message including the load indicators of the neighbor BSs. Here, the neighbor advertisement message includes DCDs/UCDs of the neighbor BSs. Similar to the DCD/UCD transmitted in step 507, the DCD/UCD of the neighbor BS includes a load indicator representing the whole resource utilization ratio and an inflexible resource utilization ratio. As a result, the BS has to acquire the DCDs/UCDs of the neighbor BSs. The DCDs/UCDs of the neighbor BSs are acquired through backhaul communication. Accordingly, although not illustrated in FIG. 5, the BS receives the DCDs/UCDs from the neighbor BSs through a backhaul network and provides its own DCD/UCD to the neighbor BSs.

Figure 6:
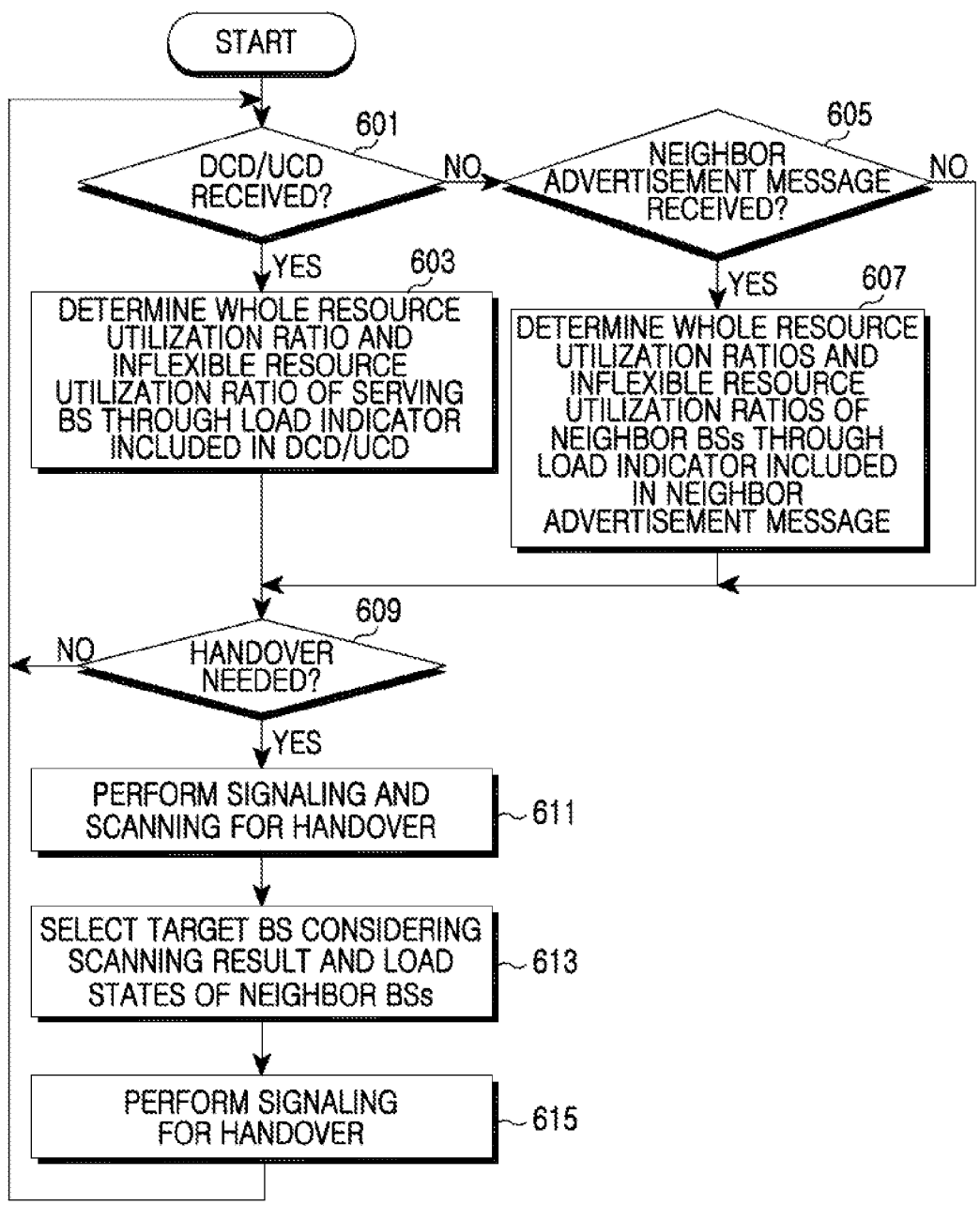
FIG. 6 is a flowchart illustrating a handover procedure of a Mobile Station (MS) in a broadband wireless communication system according to an exemplary embodiment of the present invention.

FIG. 6 is a flowchart illustrating a handover procedure of an MS in a broadband wireless communication system according to an exemplary embodiment of the present invention.

Referring to FIG. 6, in step 601, the MS determines if a DCD/UCD is received. The DCD/UCD is received over a period of a few seconds to dozens of seconds, and includes physical channel information necessary for the MS to access a BS. More particularly, the DCD/UCD includes a load indicator representing the whole resource utilization ratio and an inflexible resource utilization ratio.

If the DCD/UCD is received, the MS may proceed to step 603. In step 603, the MS determines if the whole resource utilization ratio and an inflexible resource utilization ratio of a serving BS through a load indicator are included in the DCD/UCD. Here, the whole resource utilization ratio denotes a ratio of the whole allocated resource compared to the whole resource, and the inflexible resource utilization ratio denotes a ratio of a resource allocated for a rate requiring security compared to the whole resource. However, the whole resource utilization ratio may be expressed as a ratio of a non-allocated resource and not a ratio of an allocated resource. In this case, the whole resource utilization ratio may be designated as an available resource ratio.

If the DCD/UCD is not received in step 601, the MS may proceed to step 605. In step 605, the MS determines if a neighbor advertisement message is received. The neighbor advertisement message is received over a preset period and is used to provide information of neighbor BSs to an MS intending to perform handover. More particularly, the neighbor advertisement message includes load indicators, which represent the whole resource utilization ratios and inflexible resource utilization ratios of the neighbor BSs.

If the neighbor advertisement message is received, the MS may proceed to step 607. In step 607, the MS determines if the whole resource utilization ratios and inflexible resource utilization ratios of the neighbor BSs through the load indicators are included in the neighbor advertisement message. Here, the neighbor advertisement message includes DCDs/UCDs of the neighbor BSs and, similar to the DCD/UCD received in step 601, the DCD/UCD of the neighbor BS includes a load indicator representing the whole resource utilization ratio and an inflexible resource utilization ratio. Here, the whole resource utilization ratio denotes a ratio of the whole allocated resource compared to the whole resource. The inflexible resource utilization ratio denotes a ratio of a resource allocated for a rate requiring security compared to the whole resource. However, the whole resource utilization ratio may be expressed as a ratio of a non-allocated resource and not a ratio of an allocated resource. In this case, the whole resource utilization ratio may be designated as an available resource ratio.

The MS proceeds to step 609. In step 609, the MS determines whether there is a need to perform handover. The MS continuously measures channel quality with a serving BS and, when the channel quality becomes poor, the MS determines to perform the handover.

If it is determined that the MS needs to perform the handover, the MS may proceed to step 611. In step 611, the MS performs signaling and scanning for the handover. In other words, the MS transmits a scan request message to the serving BS, receives a scan response message from the serving BS, and performs scanning intended for the neighbor BSs identified through the neighbor advertisement message.

The MS then proceeds to step 613 and selects a target BS based on the scanning result and load states of the neighbor BSs identified through the neighbor advertisement message. For example, the MS determines a rate per resource for each neighbor BS according to the scanning result, and determines a resource amount necessary for maintaining its own traffic flow. With reference to the whole resource utilization ratios of the neighbor BSs, the MS selects a neighbor BS, which has a spare resource that is more than the necessary resource amount, as the target BS. At this time, if the neighbor BS having the spare resource that is more than the necessary resource amount does not exist, the MS may select a neighbor BS having the least inflexible resource utilization ratio as the target BS.

After selecting the target BS, the MS proceeds to step 615. In step 615, the MS performs signaling for handover. In other words, the MS transmits the serving BS a handover request message that inquires about acceptance or rejection of a handover to the target BS, receives from the serving BS a handover response message that informs of the acceptance of the handover, and attempts to access the target BS.

Figure 7:
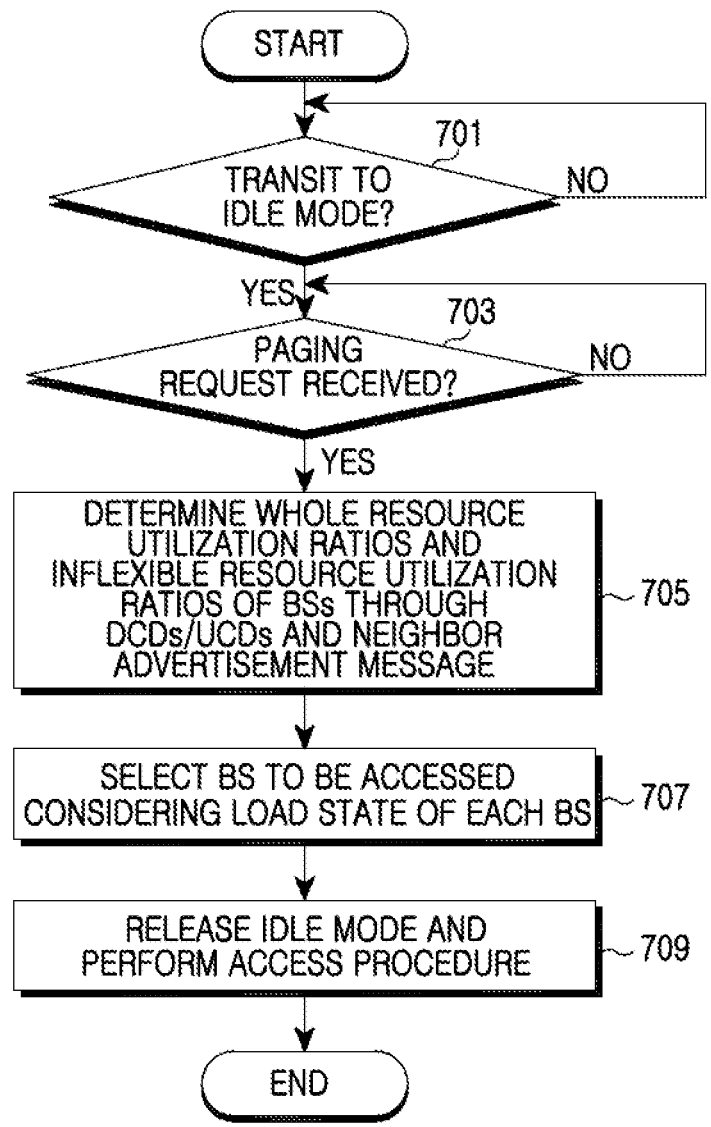
FIG. 7 is a flowchart illustrating a paging response procedure of an MS in a broadband wireless communication system according to an exemplary embodiment of the present invention.

FIG. 7 is a flowchart illustrating a paging response procedure of an MS in a broadband wireless communication system according to an exemplary embodiment of the present invention.

Referring to FIG. 7, in step 701, the MS determines whether to transition to an idle mode. In a case where a traffic flow of an activation state does not exist during a preset time, the MS transitions to the idle mode for power saving.

If the MS transitions to the idle mode, the MS may proceed to step 703. In step 703, the MS determines whether a paging request is received. That is, by periodically determining reception or non-reception of a paging request message, the MS determines if a call targeting the MS itself is generated.

If the paging request is received, the MS may proceed to step 705. In step 705, the MS determines the whole resource utilization ratios and inflexible resource utilization ratios of BSs through DCDs/UCDs or a neighbor advertisement message. Here, the whole resource utilization ratio denotes a ratio of the whole allocated resource compared to the whole resource, and the inflexible resource utilization ratio denotes a ratio of a resource allocated for a rate requiring security compared to the whole resource. However, the whole resource utilization ratio may be expressed as a ratio of a non-allocated resource and not a ratio of an allocated resource. In this case, the whole resource utilization ratio may be designated as an available resource ratio. At this time, the whole resource utilization ratio and inflexible resource utilization ratio of a BS transmitting the DCD/UCD are identified through the DCD/UCD. The whole resource utilization ratios and inflexible resource utilization ratios of neighbor BSs neighboring on a BS transmitting the neighbor advertisement message are identified through the neighbor advertisement message.

The MS proceeds to step 707. In step 707, the MS selects a BS to be accessed based on load states of BSs identified through the DCDs/UCDs and the neighbor advertisement message. For instance, the MS determines a rate per resource for each BS with reference to channel quality of the each BS, and determines a resource amount necessary for activating a traffic flow. The MS selects a BS having a spare resource that is more than the necessary resource amount with reference to the whole resource utilization ratio of the each BS. At this time, if the BS having the spare resource that is more than the necessary resource amount does not exist, the MS selects the BS having the least inflexible resource utilization ratio.

After selecting the BS to be accessed, the MS proceeds to step 709. In step 709, the MS performs a procedure of accessing the selected BS. For instance, the MS transmits an initial ranging code to the selected BS, is allocated an identifier for signaling, and performs ranging for initial access and signaling using the identifier.

The MS terminates the procedure.

Figure 8:
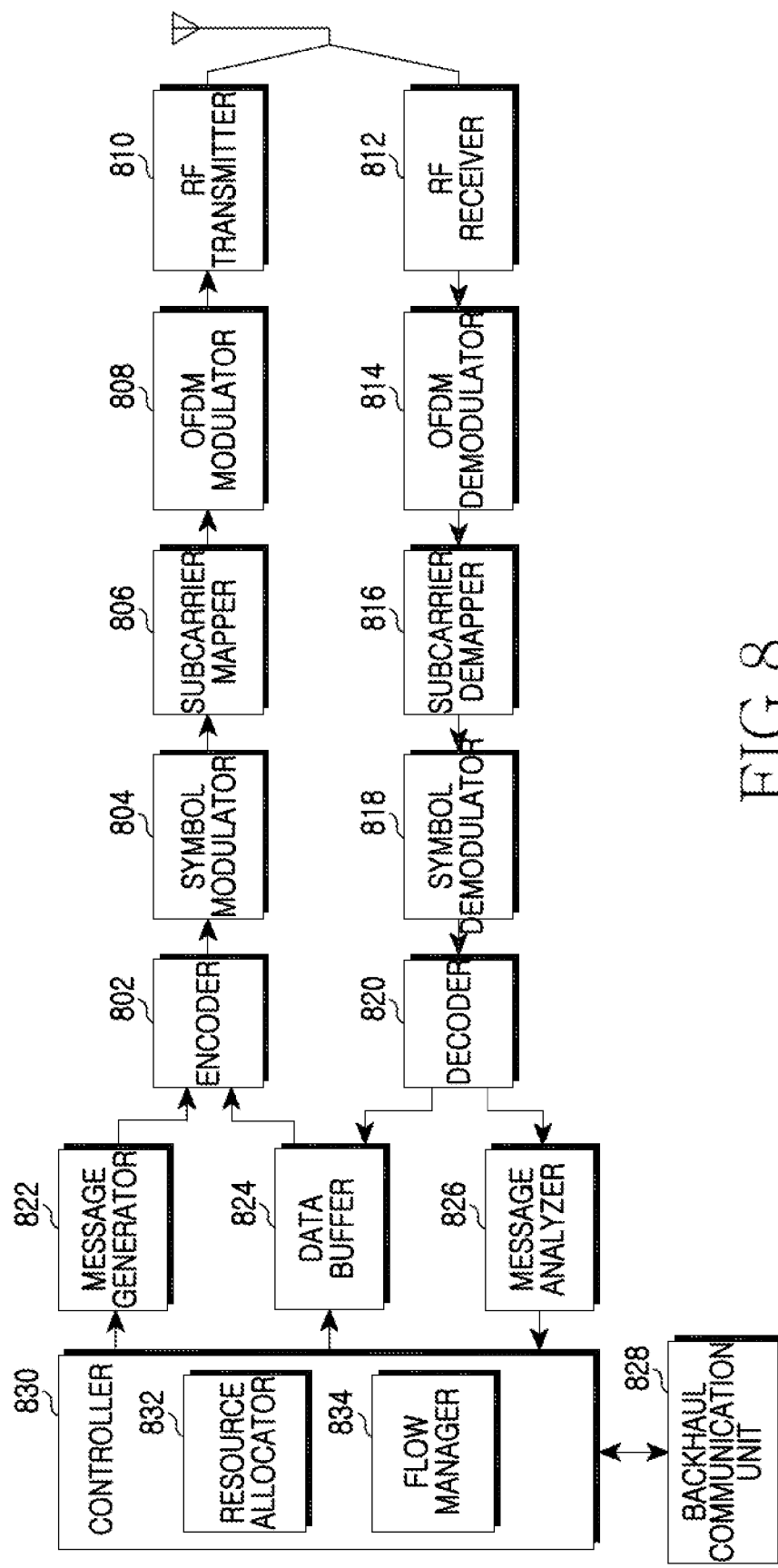
FIG. 8 is a block diagram illustrating a construction of a BS in a broadband wireless communication system according to an exemplary embodiment of the present invention.

FIG. 8 is a block diagram illustrating a construction of a BS in a broadband wireless communication system according to an exemplary embodiment of the present invention.

Referring to FIG. 8, the BS includes an encoder 802, a symbol modulator 804, a subcarrier mapper 806, an Orthogonal Frequency Division Multiplexing (OFDM) modulator 808, a Radio Frequency (RF) transmitter 810, an RF receiver 812, an OFDM demodulator 814, a subcarrier demapper 816, a symbol demodulator 818, a decoder 820, a message generator 822, a data buffer 824, a message analyzer 826, a backhaul communication unit 828, and a controller 830.

The encoder 802 channel-encodes information bit streams provided from the message generator 822 and the data buffer 824. The symbol modulator 804 converts the channel-encoded bit streams into complex symbols by modulation. The subcarrier mapper 806 maps the complex symbols to a frequency domain. The OFDM modulator 808 converts the complex symbols mapped to the frequency domain into a time domain signal through Inverse Fast Fourier Transform (IFFT) operation, and constructs OFDM symbols by inserting a Cyclic Prefix (CP). The RF transmitter 810 up-converts a baseband signal into an RF band signal and transmits the RF band signal through an antenna.

The RF receiver 812 down-converts an RF band signal received through the antenna into a baseband signal. The OFDM demodulator 814 distinguishes signals provided from the RF receiver 812 in a unit of OFDM symbol, removes a CP, and restores complex symbols mapped to a frequency domain through Fast Fourier Transform (FFT) operation. The subcarrier demapper 816 sorts the complex symbols mapped to the frequency domain in a unit of process. The symbol demodulator 818 converts the complex symbols into a bit stream by demodulation. The decoder 820 restores an information bit stream by channel-decoding the bit stream.

The message generator 822 generates a message including control information to be transmitted to an MS provided from the controller 830. For example, the message generator 822 generates a scan response message that instructs scanning for a handover of an MS, a handover response message that informs of handover acceptance or rejection, and the like. Also, the message generator 822 generates a DCD/UCD including physical channel information necessary for the MS to access the BS and a neighbor advertisement message for providing information of neighbor BSs to the MS intending to perform the handover. More particularly, the message generator 822 includes, in the DCD/UCD and the neighbor advertisement message, a load indicator representing the whole resource utilization ratio and an inflexible resource utilization ratio. Here, the whole resource utilization ratio denotes a ratio of the whole allocated resource compared to the whole resource, and the inflexible resource utilization ratio denotes a ratio of a resource allocated for a rate requiring security compared to the whole resource. However, the whole resource utilization ratio may be expressed as a ratio of a non-allocated resource and not a ratio of an allocated resource. In this case, the whole resource utilization ratio may be designated as an available resource ratio.

The data buffer 824 temporarily stores data transmitted/received, and outputs stored data according to control of the controller 830. By analyzing a message received from an MS, the message analyzer 826 reads control information included in the message and provides the control information to the controller 830. For example, the message analyzer 826 analyzes a scan request message of requesting scanning for a handover of an MS, a handover request message that inquires of acceptance or rejection of handover, and the like. The backhaul communication unit 828 provides an interface for communicating with neighbor BSs through a backhaul network. More particularly, the backhaul communication unit 828 receives DCDs/UCDs including load indicators representing the whole resource utilization ratios and inflexible resource utilization ratios of the neighbor BSs, and transmits a DCD/UCD including a load indicator representing the whole resource utilization ratio and an inflexible resource utilization ratio of the BS.

The controller 830 controls a general operation of the BS. That is, the controller 830 controls the message generator 822 to generate the DCD/UCD and the neighbor advertisement message according to a preset period. Also, the controller 830 controls to perform a handover procedure of an MS. A flow manager 834 within the controller 830 manages traffic flows of MSs. The flow manager 834 generates a traffic flow according to a service request, and manages QoS information of the traffic flow. Here, the QoS information, which is a characteristic of the traffic flow, denotes a minimum rate, a fixed rate, and the like. That is, the flow manager 834 classifies the generated traffic flows into a first type, a second type and a third type, stores QoS information of each traffic flow, and monitors a state, i.e., activation or deactivation and QoS contentment or non-contentment. A resource allocator 832 within the controller 830 allocates radio resources for traffic flows of an activation state. The resource allocator 832 allocates a resource to meet a QoS requirement of each traffic flow, based on a rate per resource for each MS. At this time, the resource allocator 832 allocates resources for traffic flows each having the minimum rate and a fixed rate by priority. However, for the sake of the minimum quality security for non-persistent traffic flows, the resource allocator 832 allocates resources for the traffic flows each having the minimum rate and the fixed rate by priority within a range in which an amount of resources for securing the minimum rate and the fixed rate does not exceed a higher limit.

In a case of instructing the message generator 822 to generate the DCD/UCD and the neighbor advertisement message, the controller 830 provides information for generating load indicators included in the DCD/UCD and neighbor advertisement message. In a case of generating the DCD/UCD, the controller 830 determines a load state of the BS. Here, the load state denotes a ratio of the whole allocated resource compared to the whole resource and a ratio of a resource allocated for a rate requiring security. Thus, the controller 830 determines the ratio of the whole allocated resource. The controller 830 measures an amount of resources allocated for the minimum rate and a fixed rate of activated first type and second type traffic flows and determines the ratio of the resource allocated for the rate requiring security. The controller 830 informs the message generator 822 of the ratio of the whole allocated resource and the ratio of the resource allocated for the rate requiring security. In case of generating the neighbor advertisement message, the controller 830 provides the message generator 822 with the load indicators, which represent the whole resource utilization ratios and the inflexible resource utilization ratios of the neighbor BSs, received through the backhaul communication unit 828.

Figure 9:
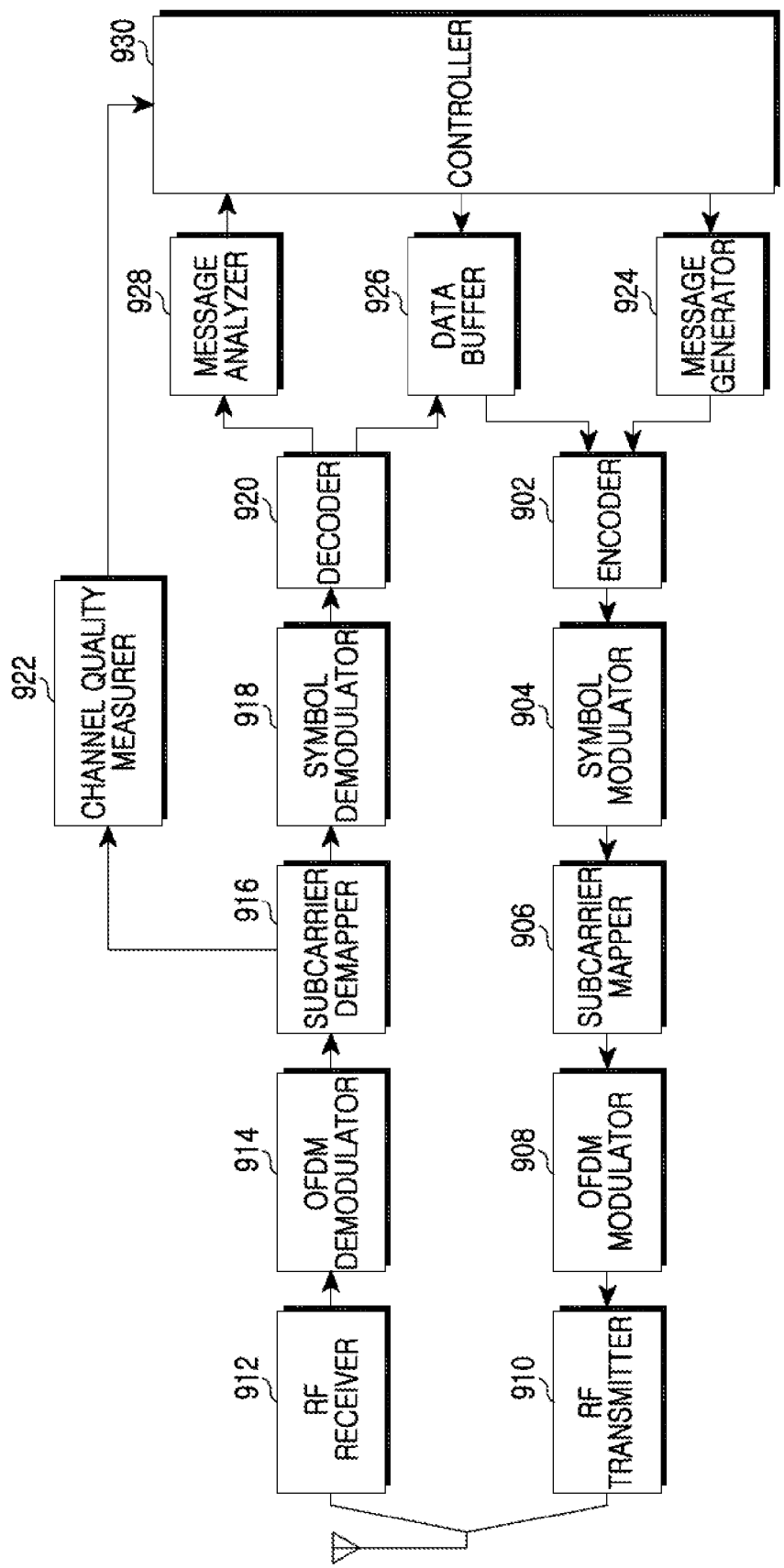
FIG. 9 is a block diagram illustrating a construction of an MS in a broadband wireless communication system according to an exemplary embodiment of the present invention.

FIG. 9 is a block diagram illustrating a construction of an MS in a broadband wireless communication system according to an exemplary embodiment of the present invention.

Referring to FIG. 9, the MS includes an encoder 902, a symbol modulator 904, a subcarrier mapper 906, an OFDM modulator 908, an RF transmitter 910, an RF receiver 912, an OFDM demodulator 914, a subcarrier demapper 916, a symbol demodulator 918, a decoder 920, a channel quality measurer 922, a message generator 924, a data buffer 926, a message analyzer 928, and a controller 930.

The encoder 902 channel-encodes information bit streams provided from the message generator 924 and the data buffer 926. The symbol modulator 904 converts the channel-encoded bit streams into complex symbols by modulation. The subcarrier mapper 906 maps the complex symbols to a frequency domain. The OFDM modulator 908 converts the complex symbols mapped to the frequency domain into a time domain signal through IFFT operation, and constructs OFDM symbols by inserting a CP. The RF transmitter 910 up-converts a baseband signal into an RF band signal and transmits the RF band signal through an antenna.

The RF receiver 912 down-converts an RF band signal received through the antenna into a baseband signal. The OFDM demodulator 914 distinguishes signals provided from the RF receiver 912 in a unit of OFDM symbol, removes a CP, and restores complex symbols mapped to a frequency domain through FFT operation. The subcarrier demapper 916 sorts the complex symbols mapped to the frequency domain in a unit of process. The symbol demodulator 918 converts the complex symbols into a bit stream by demodulation. The decoder 920 restores an information bit stream by channel-decoding the bit stream. The channel quality measurer 922 measures channel qualities with a serving BS and neighbor BSs using preamble signals of the serving BS and the neighbor BSs.

The message generator 924 generates a message including control information to be transmitted to a BS provided from the controller 930. For example, the message generator 924 generates a scan request message that requests scanning for handover, a handover request message that inquires about acceptance or rejection of handover, and the like. The data buffer 926 temporarily stores data transmitted/received, and outputs stored data according to control of the controller 930. By analyzing a message received from a BS, the message analyzer 928 reads control information included in the message, and provides the control information to the controller 930. For example, the message analyzer 928 analyzes a scan response message that instructs scanning for a handover of an MS, a handover response message that informs of acceptance or rejection of handover, and the like. More particularly, the message analyzer 928 analyzes a DCD/UCD including physical channel information necessary for accessing a BS and a neighbor advertisement message for providing information of neighbor BSs. At this time, the message analyzer 928 determines the whole resource utilization ratio and an inflexible resource utilization ratio of a serving BS through a load indicator included in the DCD/UCD, and determines the whole resource utilization ratios and inflexible resource utilization ratios of neighbor BSs through load indicators included in the neighbor advertisement message. Here, the whole resource utilization ratio denotes a ratio of the whole allocated resource compared to the whole resource, and the inflexible resource utilization ratio denotes a ratio of a resource allocated for a rate requiring security compared to the whole resource. However, the whole resource utilization ratio may be expressed as a ratio of a non-allocated resource and not a ratio of an allocated resource. In this case, the whole resource utilization ratio may be designated as an available resource ratio.

The controller 930 controls a general function of the MS. For example, when a channel quality with a serving BS measured by the channel quality measurer 922 becomes poor, the controller 930 determines whether to perform handover and controls the message generator 924 to generate the scan request message. If a scan response message is received from the BS, the controller 930 may control the channel quality measurer 922 to perform scanning intended for neighbor BSs identified through the neighbor advertisement message. If the scanning is completed, the controller 930 may select a target BS based on the scanning result and load states of the neighbor BSs identified through the neighbor advertisement message. For instance, the controller 930 determines a rate per resource for each neighbor BS according to the scanning result and determines a resource amount necessary for maintaining its own traffic flow. With reference to the whole resource utilization ratios of the neighbor BSs, the controller 930 selects a neighbor BS having a spare resource more than the necessary resource amount, as the target BS. At this time, if the neighbor BS having the spare resource more than the necessary resource amount does not exist, the controller 930 may select a neighbor BS which has the least inflexible resource utilization ratio, as the target BS. After selecting the target BS, the controller 930 controls signaling for handover.

Also, in a case where there is not a traffic flow of an activation state during a preset time, the controller 930 transits to an idle mode for power saving. That is, the controller 930 stops all remaining communication operations, except a periodic operation that attempts to receive a paging request message. If a paging request message is received in the idle mode state, the controller 930 may control the RF receiver 912, the OFDM demodulator 914, the subcarrier demapper 916, the symbol demodulator 918, the decoder 920, and the message analyzer 928 to receive and analyze a DCD/UCD and a neighbor advertisement message. By this, the controller 930 determines the whole resource utilization ratios and inflexible resource utilization ratios of BSs through the DCDs/UCDs and the neighbor advertisement message. The controller 930 then selects a BS to be accessed based on load states of the BSs. For instance, the controller 930 determines a rate per resource for each BS with reference to a channel quality with the each BS and determines a resource amount necessary for activating a traffic flow. The controller 930 selects a BS having a spare resource which is more than the necessary resource amount with reference to the whole resource utilization ratio of the each BS. At this time, if the BS having the spare resource more than the necessary resource amount does not exist, the controller 930 selects a BS having the least inflexible resource utilization ratio. After selecting the BS to be accessed, the controller 930 performs a procedure of accessing the selected BS.

Exemplary embodiments of the present invention provide an MS that more efficiently selects a serving BS by additionally providing an inflexible resource utilization ratio in addition to the whole resource utilization ratio as a load indicator of a BS in a broadband wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing load state information of a Base Station (BS) in a wireless communication system, the method comprising:
    determining a ratio of a whole allocated resource compared to a whole resource of the BS and a ratio of a resource allocated for traffic flow requiring a fixed or minimum rate compared to the whole resource;
    generating at least one load indicator for indicating a first value expressing the ratio of the whole allocated resource and a second value expressing the ratio of the resource allocated for the traffic flow requiring the fixed or minimum rate; and
    transmitting the at least one load indicator to a Mobile Station (MS),
    wherein the MS determines a resource amount necessary for activating a traffic flow for at least one BS, determines whether there is a BS comprising a spare resource which is more than the necessary resource amount using the first values of BSs, if there is the BS comprising the spare resource which is more than the necessary resource amount selects the BS comprising the spare resource which is more than the necessary resource amount as a BS to access, and, if there is not the BS comprising the spare resource which is more than the necessary resource amount, selects a BS comprising a ratio of a resource allocated for the traffic flow requiring the fixed or minimum rate as the BS to access.

2. The method of claim 1, wherein the determining of the ratio of the resource allocated for the traffic flow requiring the fixed or minimum rate comprises:
    determining the fixed rate and the minimum rate of at least one traffic flow comprising a rate constraint;
    summing amounts of resources allocated to secure the fixed rate and the minimum rate; and
    determining a ratio of the summation result compared to the whole resource.

3. The method of claim 1, wherein the first value expresses the ratio of at least one of the whole allocated resource and a ratio of a resource not allocated in the whole resource.

4. The method of claim 1, wherein the transmitting of the at least one load indicator comprises broadcasting a message comprising the at least one load indicator,
    the message comprising at least one of a Downlink Channel Descriptor (DCD) and an Uplink Channel Descriptor (UCD) for providing physical channel information necessary for accessing the BS.

5. The method of claim 1, wherein the load indicator is transmitted to neighbor BSs.

6. The method of claim 5, further comprising receiving at least one load indicator for the neighbor BSs from the neighbor BSs.

7. The method of claim 6, further comprising broadcasting a message comprising the at least one load indicator for the neighbor BSs,
    the message comprising a neighbor advertisement message for providing information of the neighbor BSs to an MS intending to perform handover.

8. A method for handover of a Mobile Station (MS) in a wireless communication system, the method comprising:
    determining, through at least one load indicator included in a message received from a BS, first values expressing ratios of whole allocated resources compared to whole resources for neighbor BSs and second values expressing ratios of resources allocated for traffic flow requiring fixed or minimum rates compared to the whole resources;
    selecting a target BS among the neighbor BSs based on the first values and the second values, wherein the selecting comprises:
        determining a resource amount necessary for activating a traffic flow for at least one BS;
        determining whether there is a BS comprising a spare resource which is more than the necessary resource amount, using the first values;
        if there is a BS comprising the spare resource which is more than the necessary resource amount, selecting the BS comprising the spare resource which is more than the necessary resource amount, as a BS to access; and
        if there is not a BS comprising the spare resource which is more than the necessary resource amount, selecting a BS comprising a ratio of a resource allocated for the traffic flow requiring the minimum rate, as the BS to access; and
    performing a handover to the target BS.

9. The method of claim 8, wherein the first value expresses at least one of the ratio of the whole allocated resource and a ratio of a resource not allocated in the whole resource.

10. A method for a paging response of a Mobile Station (MS) in a wireless communication system, the method comprising:
    if a paging request occurs, determining, through at least one load indicator comprised in at least one message received from a BS, a first value expressing a ratio of the whole allocated resource compared to the whole resource for at least one Base Station (BS) and a second value expressing a ratio of a resource allocated for traffic flow requiring a fixed or minimum rate compared to the whole resource;

selecting a BS to access among the at least one BS based on the first value and the second value, wherein the selecting comprises:
  determining a resource amount necessary for maintaining a traffic flow for neighbor BSs;
  determining whether there is a neighbor BS comprising a spare resource which is more than the necessary resource amount, using the first value;
  if there is a neighbor BS comprising the spare resource which is more than the necessary resource amount, selecting the neighbor BS comprising the spare resource more than the necessary resource amount, as a target BS; and
  if there is not a neighbor BS comprising the spare resource which is more than the necessary resource amount, selecting a neighbor BS comprising a ratio of resource allocated for the traffic flow requiring the minimum rate, as the target BS; and
performing an initial access procedure to the BS to access.

11. The method of claim 10, wherein the first value expresses at least one of the ratio of the whole allocated resource and a ratio of a resource not allocated in the whole resource.

12. A Base Station (BS) apparatus in a wireless communication system, the apparatus comprising:
  a controller for determining a ratio of a whole allocated resource compared to a whole resource of the BS and a ratio of a resource allocated for traffic flow requiring a fixed or minimum rate compared to the whole resource;
  a generator for generating at least one load indicator for indicating a first value expressing the ratio of the whole allocated resource and a second value expressing the ratio of the resource allocated for the traffic flow requiring the fixed or minimum rate; and
  a transmitter for transmitting the at least one load indicator to a Mobile Station (MS),
  wherein the MS determines a resource amount necessary for activating a traffic flow for at least one BS, determines whether there is a BS comprising a spare resource which is more than the necessary resource amount using the first values of BSs, if there is the BS comprising the spare resource which is more than the necessary resource amount, selects the BS comprising the spare resource which is more than the necessary resource amount as a BS to access, and, if there is not the BS comprising the spare resource which is more than the necessary resource amount, selects a BS comprising a ratio of a resource allocated for the traffic flow requiring the fixed or minimum rate as the BS to access.

13. The apparatus of claim 12, wherein the controller determines the ratio of the resource allocated for the rate requiring security, by determining the fixed rate and the minimum rate of at least one traffic flow comprising a rate constraint, summing up amounts of resources allocated to secure the fixed rate and the minimum rate, and determining a ratio of the summation result compared to the whole resource.

14. The apparatus of claim 12, wherein the first value expresses the ratio of at least one of the whole allocated resource and a ratio of a resource not allocated in the whole resource.

15. The apparatus of claim 12, wherein the transmitter broadcasts a message comprising the at least one load indicator,
the message comprising at least one of a Downlink Channel Descriptor (DCD) and an Uplink Channel Descriptor (UCD) for providing physical channel information necessary for accessing the BS.

16. The apparatus of claim 12, wherein the transmitter transmits the at least one load indicator to neighbor BSs.

17. The apparatus of claim 16, further comprising a communication unit for receiving at least one load indicator for the neighbor BSs from the neighbor BSs.

18. The apparatus of claim 17, wherein the transmitter broadcasts a message comprising the at least one load indicator for the neighbor BSs,
  the message comprising a neighbor advertisement message for providing information of the neighbor BSs to an MS intending to perform handover.

19. A Mobile Station (MS) apparatus in a wireless communication system, the apparatus comprising:
  an analyzer for determining, through at least one load indicator included in a message received from a BS, first values expressing ratios of the whole allocated resources compared to whole resources for neighbor BSs and second values expressing ratios of resources allocated for traffic flow requiring a fixed or minimum rate compared to the whole resources; and
  a controller for selecting a target BS among the neighbor BSs based on the first values and the second values, and performing a handover to the target BS,
  wherein the controller determines a resource amount necessary for activating a traffic flow for at least one BS, determining whether there is a BS comprising a spare resource which is more than the necessary resource amount using the first values, if there is a BS comprising the spare resource which is more than the necessary resource amount, selecting, as a BS to access, the BS comprising the spare resource which is more than the necessary resource amount, and, when there is not the BS having the spare resource more than the necessary resource amount, and selecting, as the BS to access, a BS comprising a ratio of a resource allocated for the traffic flow requiring the minimum rate.

20. The apparatus of claim 19, wherein the first value expresses at least one of the ratio of the whole allocated resource and a ratio of a resource not allocated in the whole resource.

21. A Mobile Station (MS) apparatus in a wireless communication system, the apparatus comprising:
  an analyzer for, if a paging request occurs, determining, through at least one load indicator comprised in at least one message received from a BS, a first value expressing a ratio of the whole allocated resource compared to the whole resource for at least one Base Station (BS) and a second value expressing a ratio of a resource allocated for traffic flow requiring a fixed or minimum rate compared to the whole resource; and
  a controller for selecting a BS to access among the at least one BS based on the first value and the second value, and performing an initial access procedure to the BS to access,
  wherein the controller determines a resource amount necessary for maintaining a traffic flow for neighbor BSs, determining whether there is a neighbor BS comprising a spare resource which is more than the necessary resource amount using the first value, if there is a neighbor BS comprising the spare resource which is more than the necessary resource amount, selecting as a target BS the neighbor BS comprising the spare resource more than the necessary resource amount, and, if there is not a neighbor BS comprising the spare resource which is more than the necessary resource amount, selecting as the target BS a neighbor BS comprising a ratio of resource allocated for the traffic flow requiring the minimum rate.

22. The apparatus of claim 21, wherein the first value expresses at least one of the ratio of the whole allocated resource and a ratio of a resource not allocated in the whole resource.

* * * * *